United States Patent [19]
Hirai

[11] Patent Number: 5,289,225
[45] Date of Patent: Feb. 22, 1994

[54] PHOTOMETERING APPARATUS OF CAMERA FOR VARIABLY WEIGHTING DIFFERENT AREAS OF AN IMAGE AREA

[75] Inventor: Isamu Hirai, Tokyo, Japan

[73] Assignee: Asahi Kogaku Kogyo Kabushiki Kaisha, Tokyo, Japan

[21] Appl. No.: 709,966

[22] Filed: Jun. 4, 1991

[30] Foreign Application Priority Data

Jun. 5, 1990 [JP] Japan .................................. 2-145415

[51] Int. Cl.⁵ .......................... G03B 3/00; G03B 7/08; G03B 13/36
[52] U.S. Cl. ...................................... 354/402; 354/432
[58] Field of Search ................ 354/402, 432, 429, 431; 250/214 P

[56] References Cited
U.S. PATENT DOCUMENTS

| | | | |
|---|---|---|---|
| 4,774,401 | 9/1988 | Yamada et al. .................. | 250/250.1 |
| 4,937,611 | 6/1990 | Miyazaki ........................ | 354/432 |
| 5,146,258 | 9/1992 | Bell et al. ....................... | 354/432 |

Primary Examiner—David M. Gray
Assistant Examiner—J. K. Han
Attorney, Agent, or Firm—Sandler Greenblum & Bernstein

[57] ABSTRACT

A photometering apparatus for a camera is provided that includes a split type photometering device for measuring the luminance of an object to be photographed and in which an image area is divided into a plurality of object luminance measuring zones, an automatic focusing device which selectively has a focus lock mode in which once an object within an object distance measuring is in focus, the focus is maintained, and a non-focus lock mode in which the focus is continuously adjusted within the object distance measuring zone. The photometering apparatus also includes an exposure controller which varies the weighting of the luminance signals of the object luminance measuring zones of the split type photometering device, in order to calculate an exposure value, depending on the selection of the focus lock mode or the non-focus lock mode.

10 Claims, 7 Drawing Sheets

1/3  center  1/3

1/3  center  1/3

PHOTOMETERING APPARATUS OF CAMERA FOR VARIABLY WEIGHTING DIFFERENT AREAS OF AN IMAGE AREA

BACKGROUND OF THE INVENTION

Field of the Invention

The present invention relates to a photometering apparatus in which the light receiving area of a photometering element is divided into a plurality of metering zones to calculate exposure conditions in accordance with luminance (i.e. brightness) data of the divided metering zones.

Description of Related Art

In a known split photometering apparatus having divided metering zones, it is assumed that the main object to be taken (as photographed) is located at the center of an image area, and accordingly, if the main object which is deviated from the center of the image area is taken, there is a possibility that an optimum exposure condition will not be obtained.

It is also known to use a split photometering apparatus in combination with a multi-point object distance measuring device so as to detect and evaluate the position of the main object. In this known apparatus, the closest object is considered to be the main object, so that the exposure conditions corresponding to the main object are determined. However, in the known device, it is necessary to provide a plurality of object distance measuring devices in order to detect the object distances at a plurality of points, thus resulting in a complex construction and an expensive camera.

SUMMARY OF THE INVENTION

The primary object of the present invention is to provide a simple and inexpensive photometering apparatus in which the luminance of the main object can be accurately detected without detecting object distances at a plurality of points.

Another object of the present invention is to provide a split photometering apparatus with divided light receiving zones, which can better detect the luminance of the main object.

To complete the present invention, the inventor has analyzed different auto focus modes provided in an automatic focusing camera as well as the positions of the main object within a picture plane (or frame) in the auto focus modes.

In a known single lens reflex camera, there is provided a specific mode selection switch. When the mode selection switch is turned ON, the focus lock function is engaged and the main object may be moved from the center of the image area (object distance measuring zone), while the focus is maintained on the main object. When the specific mode selection switch is turned OFF (the non-focus lock position), the focus is continuously adjusted within the object distance measuring zone. Generally, the focus lock function is performed by a mode called the focus-priority mode (AF single mode), and the non-focus lock function is performed by a mode called the shutter-release-priority mode (AF servo mode), one of which is selected, via the mode selection switch, by an operator.

In a known compact camera, called a lens shutter type camera, only the focus lock function is usually provided, which is equivalent to the mode selection switch ON position in a single lens reflex camera.

The inventor's analysis of the present invention has revealed that there is a specific tendency (characteristic) peculiar to the auto focus modes regarding the position of the main object within the image area. The inventor has found that the luminance of the main object can be more precisely detected by utilizing this knowledge.

To achieve the objects mentioned above, according to an aspect of the present invention, there is provided a photometering apparatus of a camera comprising a split type photometering device for measuring the luminance of an object to be photographed in which a image area is divided into a plurality of object distance measuring zones. An automatic focusing device is provided which selectively performs a focus lock function, in which the object may be moved from the center of the picture plane (object distance measuring zone) keeping the focus adjusted to the object, and a non-focus lock function in which the focus is continuously adjusted within the object distance measuring zone. An exposure control mechanism is used to vary the weighting of the luminance signals of the object distance luminance zones of the split type photometering device in order to calculate an exposure value, depending on the focus lock mode (function) and the non-focus lock mode (function).

In accordance with another aspect of the present invention, there is provided a photometering apparatus of a camera which comprises a first photometering zone corresponding to the center of a rectangular image area; a second photometering zone which contains points located at the intersection of the first two lines which equally divide a major side of the rectangular image area into three segments and the line normal to these first two lines, on which the center point of the image area lies, and points located at the intersection of the second two lines which equally divide a minor side of the rectangular image area into three segments and the line normal to these second two lines, also on which the center point of the image area lies; a third photometering zone corresponding to the peripheral area of the image area; and, an arithmetic operating (or calculating) mechanism for calculating the exposure value in accordance with the output of the first, second and third photometering zones.

This photometering apparatus could be applied to a single lens reflex camera having both the focus lock function and the non-focus lock function mentioned above, and a compact camera having only the focus lock function. Specifically, it is preferable to provide this photometering apparatus in a compact camera having only the focus lock function to detect the object luminance and to determine the exposure value more precisely.

BRIEF DESCRIPTION OF THE DRAWINGS

The invention will be described below in detail with reference to the accompanying drawings, in which.

DESCRIPTION OF THE PREFERRED EMBODIMENTS

The following discussion will first be directed to the position of the main object within the image area and how it varies depending upon the selection of auto focus modes.

In the focus lock mode (function), once an object within the object distance measuring zone is in focus, after depressing the release switch by a half step in order to effect the auto focusing and to turn the photometering switch ON, a focus lock functions so that the focused state is held until the release switch is released. Consequently, if the release switch is depressed by a half step when the main object is located at the center of the image area (object distance measuring zone), and if the framing is carried out after focusing, a picture of the main object in focus can be obtained even if the main object is moved from the center of the image area (object distance measuring zone) and is located in the vicinity of the peripheral portion of the image area.

On the other hand, in the non-focus lock mode, the focus of the object within the object distance measuring zone is continuously adjusted even if the object (distance) within the object distance measuring zone is varied by framing after the release switch is depressed by a half step.

Figure 6A:
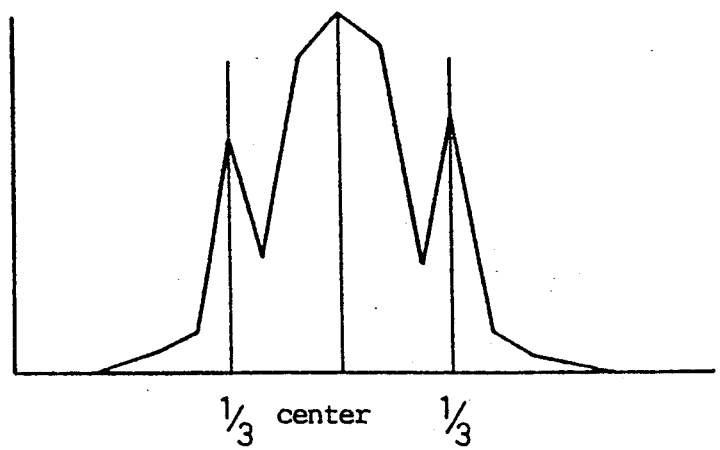
Figure 6B:
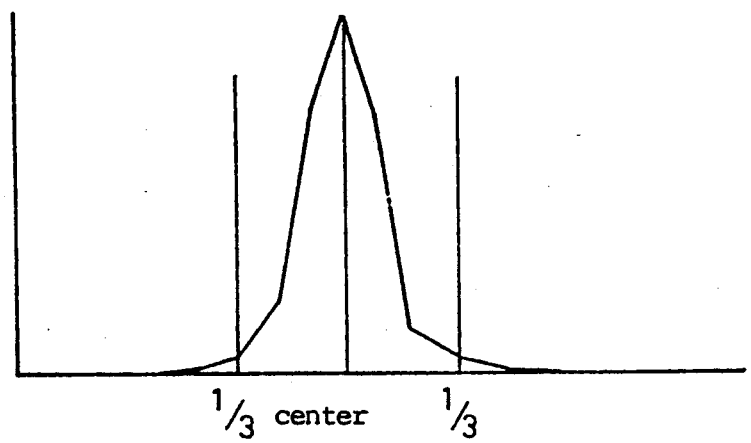

FIG. 6a shows a probability distribution of the main object position in an automatic focusing camera using a focus lock function in which the main object may be intentionally deviated from the center of the image area. FIG. 6b shows a probability distribution of the main object position, also in an automatic focusing camera, in which the focus lock function is not used.

As mentioned above, since the focus lock functions in the focus lock mode, it is possible to take a picture of the main object which is intentionally deviated from the center of the image area (object distance measuring zone). From a statistical point of view, it is unlikely that the main object would be located at the extremes of the image area. In most cases, the main object is located either at the center (most frequent case) of the image area or at a position deviated from the ends of the image area by about one third, as shown in FIG. 6a.

On the other hand, in the non-focus lock position the auto focus function works by focusing on the object located at the center of the image area (object distance measuring zone), as mentioned above. Consequently, a picture of the main object located at the center of the image area is usually taken in the non-focus lock function, as shown in FIG. 6b.

As can be understood from the foregoing, in the focus lock mode, the main object is neither always located at the center of the image area nor extremely close to the end edges of the image area. On the other hand, in the non-focus lock mode, there is a high probability that the main object will be in the vicinity of the center of the image area.

In the present invention, the probabilities of the positions of the main object within the image area when the focus lock mode is either ON or OFF (is used or not), as described above, are taken into account to ensure a precise detection of the luminance.

Figure 4:
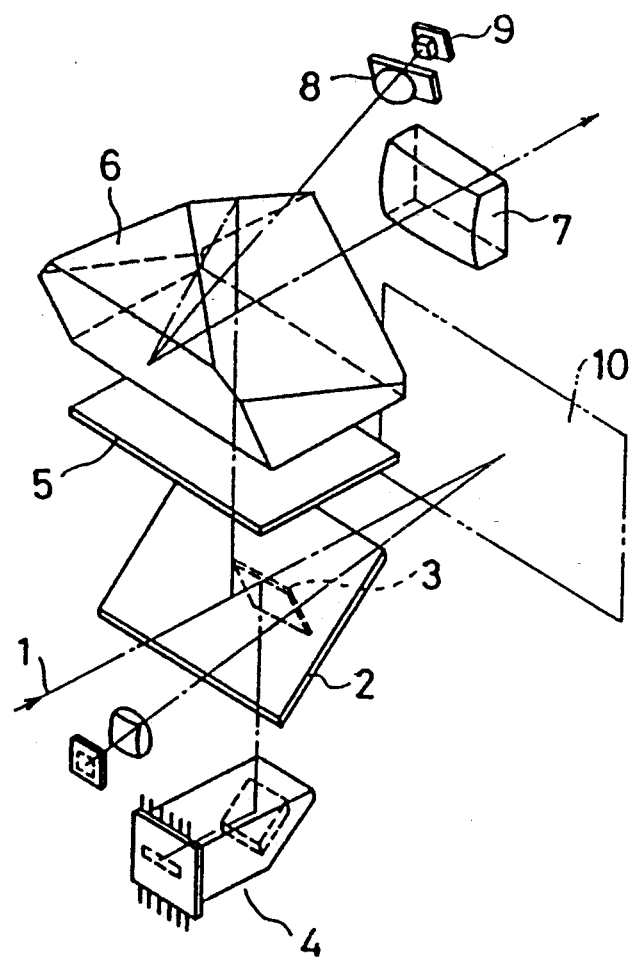
FIG. 4 is a perspective view of a main part of a camera according to an aspect of the present invention.

FIG. 4 shows a single lens reflex camera having a photometering device according to the present invention.

In FIG. 4, light 1 transmitted through a photographing lens and incident upon a main mirror (half mirror) 2, where it is split by the main mirror 2. Namely, the incident light 1 is partly transmitted through the main mirror 2 and reflected by an auxiliary mirror 3 towards a focus detector 4. On the other hand, the incident light 1 is partly reflected by the main mirror 2 and is made incident upon a pentagonal prism 6 through a focusing plate 5. The light transmitted through the pentagonal prism 6 is made incident upon a viewer's eye and a photometering light receiving element 9 through a view finder magnifier 7 and a condenser lens 8, respectively. The photometering light receiving element 9 detects luminances (brightnesses) of the respective object luminance measuring zones of the image area.

Upon taking a picture, the main mirror 2 and the auxiliary mirror 3 rotate to be retracted from the photographing light path, so that the incident light is made incident upon a film plane 10, as is well known. The light receiving surface of the focus detector 4 and the light receiving surface of the photometering light receiving element 9 are located so as to be optically conjugate with the film plane 10, respectively.

Figure 1:
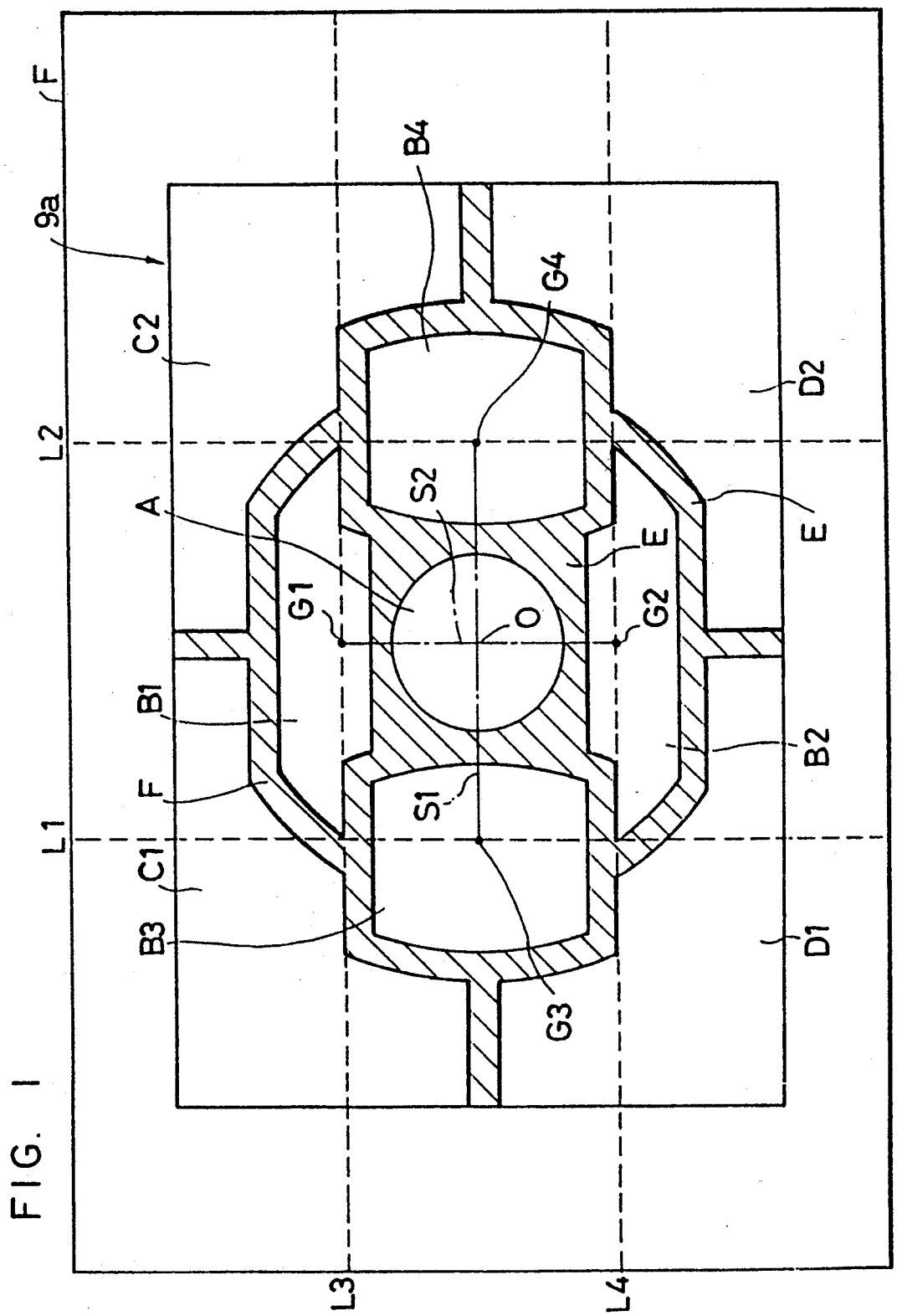
FIGS. 1, 2 and 3 are schematic views of different split patterns of a photometering light receiving element in a photometering device according to an aspect of the present invention.
Figure 2:
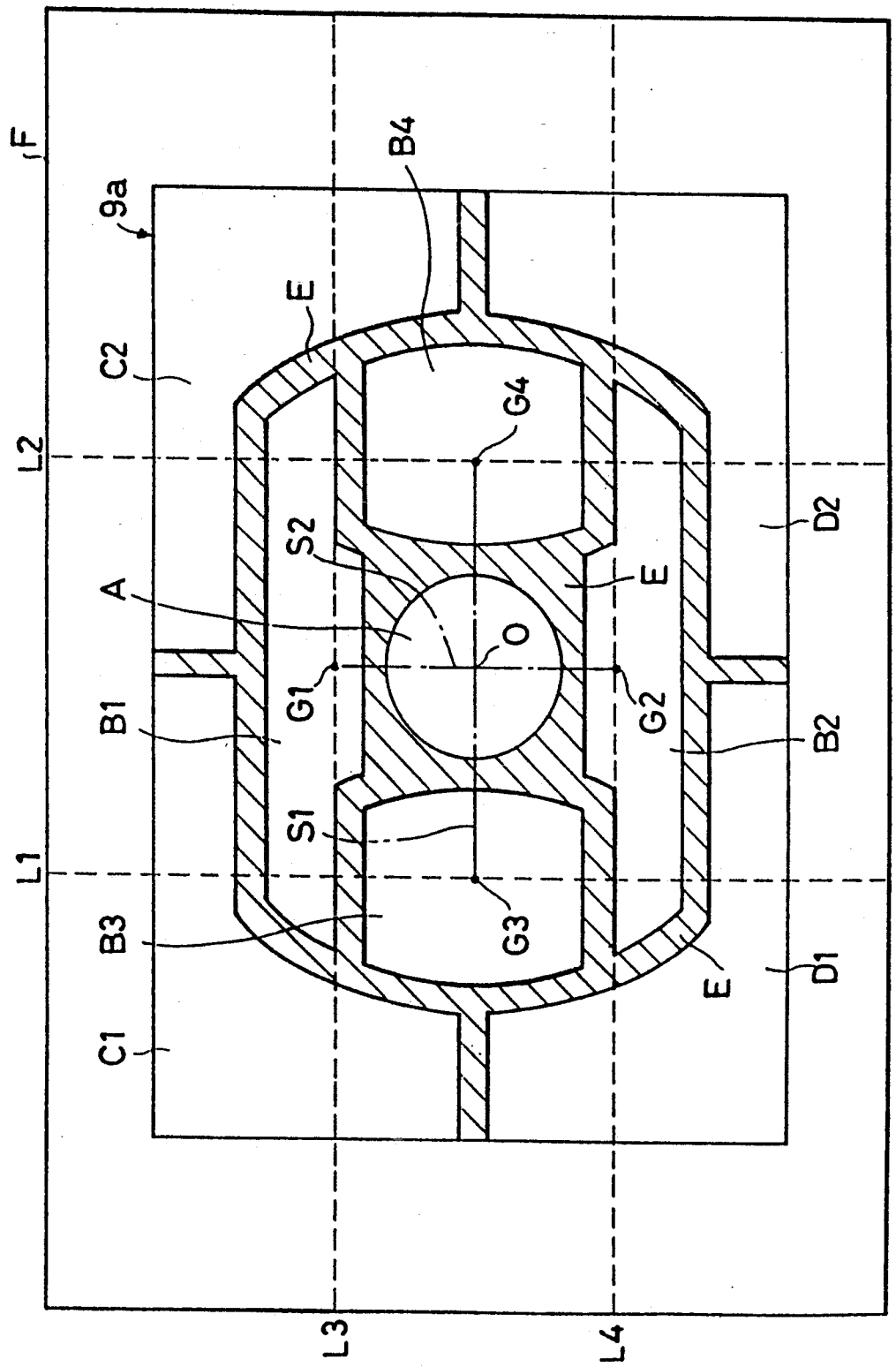
Figure 3:
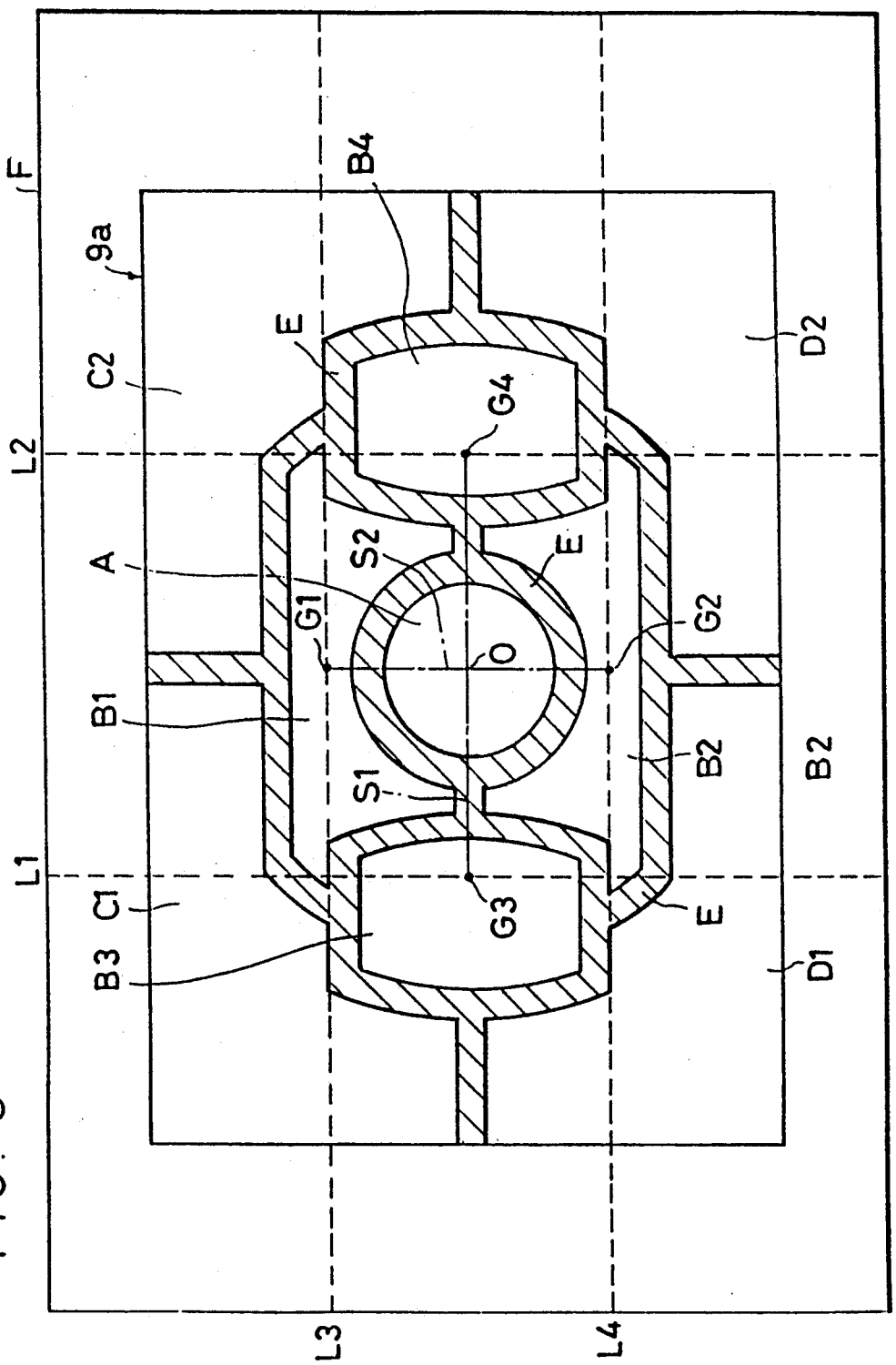

FIGS. 1 through 3 show three different split patterns of a light receiving area 9a of the photometering light receiving element 9. An area F which is located outside the light receiving area 9a to surround the latter corresponds to an image area of the film.

There are two lines L1 and L2 which equally divide the major side of the rectangular image area area F into three segments, and two lines L3 and L4 which equally divide the minor side of the rectangular image area area F into three segments, in the light receiving area 9a.

A first circular photometering zone (central photometering zone) A is provided in a center area defined by and between the lines L1 and L2 and the lines L3 and L4. There are two pairs of second photometering zones (intermediate photometering zones) B1, B2 and B3, B4 which include imaginary intersecting points G1 and G2 between the lines L3, L4 and a line S2 which passes a center point O of the image area and extends perpendicularly to the lines L3, L4, and imaginary intersecting points G3 and G4 between the lines L1, L2 and a line S1 which passes the center point O of the image area and extends perpendicularly to the lines L1, L2, respectively.

There are two upper peripheral light receiving zones C1 and C2 and two lower peripheral light receiving zones D1 and D2 to surround the first photometering zone A and the four second photometering zones B1, B2, B3 and B4. These photometering zones C1, C2 and D1, D2 form a third photometering zone (peripheral photometering zone).

The photometering zones A, B1 through B4, C1, C2, D1 and D2 are separated from each other by an insensible band E which is hatched in FIGS. 1 through 3, so that the photometering zones are photoelectrically isolated from one another. The width of the insensible band E is such that interference between the luminance signals of the adjacent photometering zones does not occur or is such that the luminance signals are free from noise, so that accurate luminance data can be outputted from the light receiving element 9.

The split patterns of the photometering zones A, B1 through B4, C1, C2, D1 and D2 shown in FIGS. 1, 2 and 3 are determined in accordance with the probabilities of the positions of the main object within the picture plane in the focus lock mode so as to satisfy the principle mentioned above, although the shapes of the photometering zones and accordingly the insensible bands E in FIGS. 1, 2 and 3 are different from one another, as can be seen in the drawings.

Figure 5A:
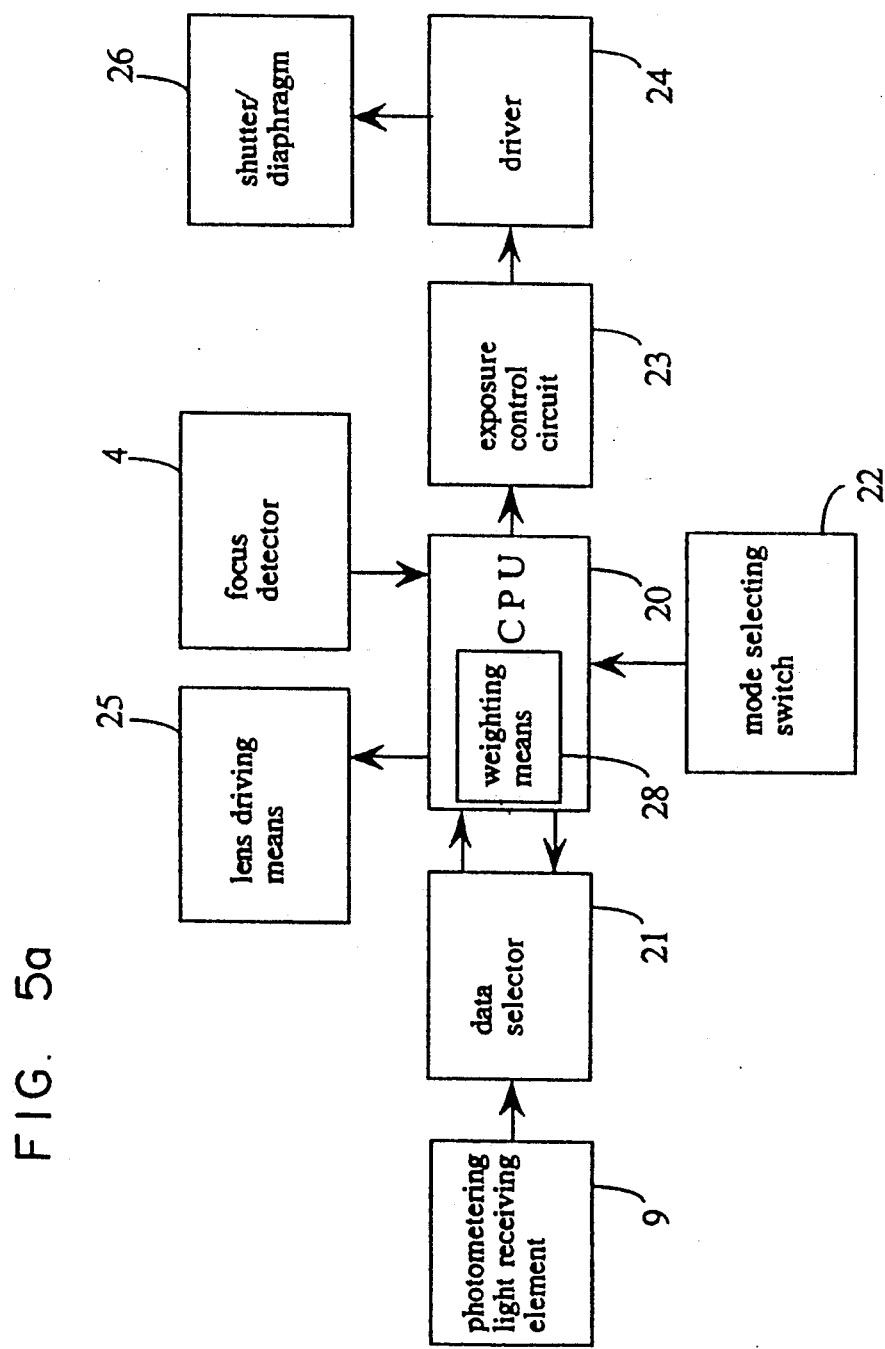
FIG. 5a is a block diagram of a control circuit of a camera shown in FIG. 4.

FIG. 5a is a block diagram of a control circuit of a camera to which the present invention is applied.

The outputs of the light receiving zones (photometering zones) of the photometering light receiving element 9 are sent to a CPU 20 through a data selector 21. The focus detector 4, a mode selecting switch 22 for switching the auto focus mode between the focus lock ON (focus-priority mode) and OFF (shutter-release-priority mode) positions, and manual mode, as well as an exposure control circuit 23 are connected to the CPU 20. A driver 24 is connected to the exposure control circuit 23 to drive a shutter/diaphragm 26. The CPU 20 has a weighting means 28 which weights the luminance values detected by the photometering zones A, B1 through B4, C1, C2, D1 and D2 to determine the exposure value.

The CPU 20 causes a lens driving means 25 connected thereto to drive a lens unit (not shown) so as to make the focus of the lens unit coincide with the object (subject) in accordance with the signals from the focus detector 4. The CPU 20 also controls the exposure control circuit 23 in accordance with the data input thereto from the photometering light receiving element 9 and the mode selecting switch 22 in accordance with the weights determined by the weighting means 28, to thereby drive the shutter/diaphragm (shutter and diaphragm) 26.

Figure 5B:
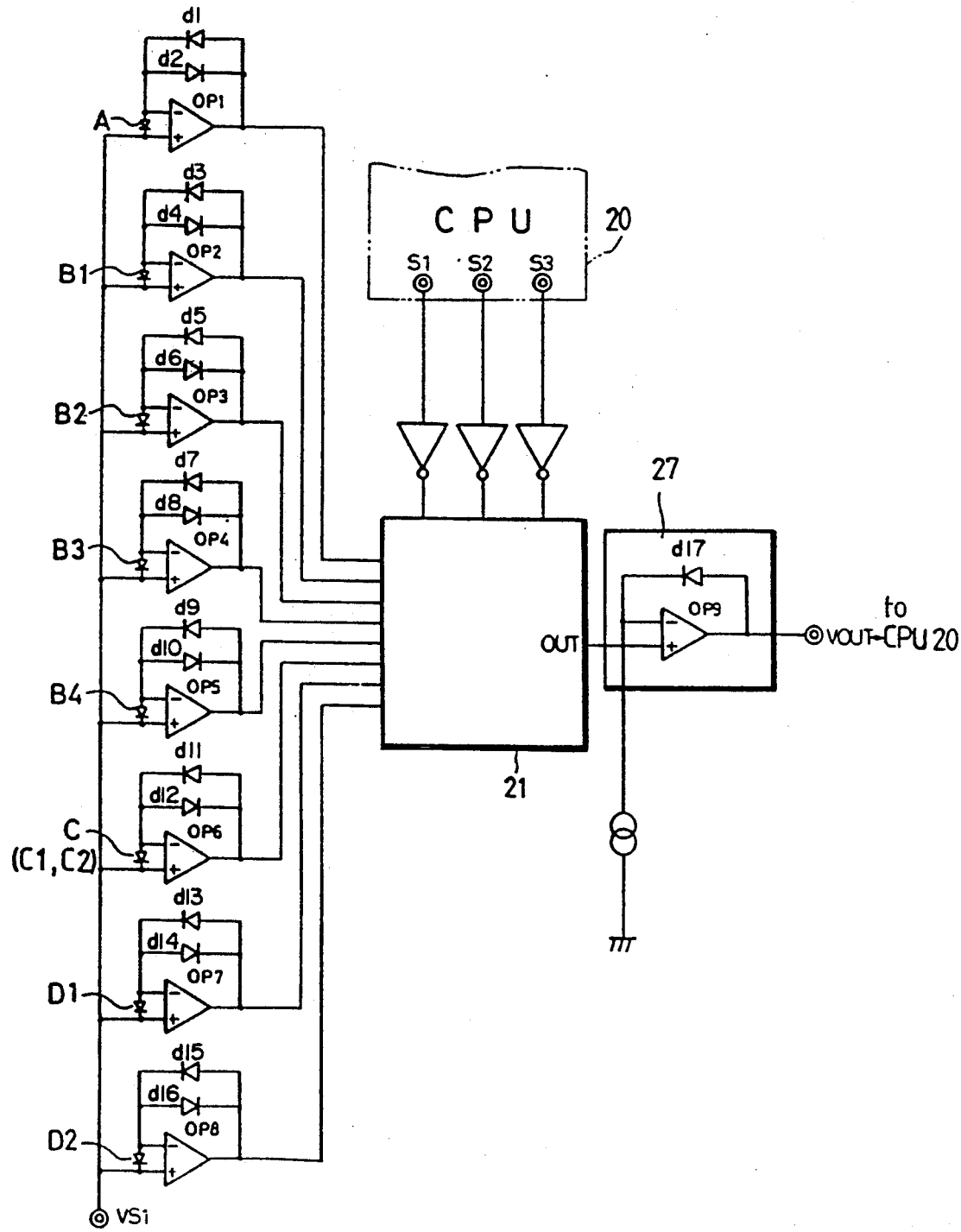
FIG. 5b is a diagram of a circuit arrangement of a photometering light receiving element and a data selector shown in FIG. 5a; and, FIGS. 6a and 6b are diagrams showing probabilities of distributions of positions of the main object in different auto focus modes.

FIG. 5b shows a circuit connecting the photometering light receiving element 9 and the data selector 21.

The photometering zones A, B1 through B4, C (C1 and C2), D1, and D2 of the photometering light receiving element 9 are all represented by photodiodes (eight photodiodes), in FIG. 5b. In the illustrated embodiment, the upper peripheral photometering zones C1 and C2 which are usually located at positions corresponding to the background of the sky are represented by one photodiode. Each of the photodiodes has two diodes (d1, d2; d3, d4; ... d15, d16) and an operational amplifier (OP1, OP2, ... OP8) in combination to constitute a luminance outputting circuit which outputs an analog signal of the object luminance to the data selector 21. The operational amplifiers (OP1–OP8) are provided with a reference voltage signal VS1.

To the data selector 21 are connected three signal lines S1, S2 and S3 which are in turn connected to the CPU 20, so that 3-bit selection signals are inputted to the data selector 21 from the CPU 20 through the signal lines. The data selector 21 selects a predetermined photometering zone from among the photometering zones A, B1, ... D2 in accordance to the selection signals input thereto from the CPU 20 and outputs the luminance signals of the selected photometering zone to the CPU 20 through an amplifier 27. The amplifier 27 is comprised of a diode D17 and an operational amplifier OP9. A constant current source 29 is provided for the amplifier 27.

The weighting means 28 determines the exposure value X by the output (luminance values) detected by the photometering zones A, B1 through B4, C1 and C2, D1 and D2 of the photometering light receiving element 9 in accordance with the following formula, which is shown by way of example:

$$X = C(x_1 \cdot A + x_2 \cdot B1 + x_3 \cdot B2 + x_4 \cdot B3 + x_5 \cdot B4 + x_6 \cdot C1 + x_7 \cdot C2 + x_8 \cdot D1 + x_9 \cdot D2)$$

wherein the values $x_1, x_2, \ldots x_9$ are determined by the signal output from the mode selecting switch 22. C is a constant which is either determined in advance or is determined by the output of the mode selecting switch 22.

The operation of a camera having a photometering device of the present invention, as constructed above is described below.

In the camera of the present invention, similar to a conventional camera, the shutter button is depressed, first by a half step to turn the photometering switch ON and then by a full step to turn the release switch ON. When the photometering switch is turned ON, the object luminance and the object distance (the defocus amount and the defocus direction) are detected in order to subsequently calculate the exposure value and the displacement of the focusing lens necessary for automatic focusing.

When the shutter button is depressed by a first step to turn the photometering switch ON, the luminance of the object which is formed on the light receiving area 9a of the photometering light receiving element 9, shown in FIGS. 1 through 3, is detected by the respective photometering zones A, B1, ... D2. The luminance signals corresponding to the luminances of the respective photometering zones are successively inputted to the CPU 20 through the data selector 21 in accordance with the selection signals from the CPU 20. The CPU 20 also receives focusing signals from the focus detector 4 as well as auto focus mode detection signals, namely focus lock mode (focus-priority mode) signal or non-focus lock mode (release-priority mode) signal from the mode selecting switch 22.

Consequently, the CPU 20 (the weighting means 28) calculates the exposure value in accordance with the luminance signals (electrical signals) from the light receiving zones A, B1, ... D2 of the photometering light receiving element 9 and the auto focus mode detection signal from the mode selecting switch 22, as mentioned before.

In other words, when the non-focus lock mode is selected by the mode selecting switch 22, the luminance of the first photometering zone A is weighted in comparison with the luminances of the other photometering zones upon calculation of the exposure value. The weighting of the luminance of the first photometering zone A is carried out for example in accordance with the distribution shown in FIG. 6b. Conversely, when the focus lock mode is selected, the luminances of the second photometering zones (B1 through B4) and/or the third photometering zones (C, D1 and D2) are weighted relative to the luminance of the first photometering zone A, upon calculation of the exposure value. The weighting of the luminances of the second and/or the third photometering zones is carried out, for example, in accordance with the distribution shown in FIG. 6a.

In particular, in the case of the focus lock mode, if in the first photometering zone A there is a luminance difference between the first and second photometering operations of more than some predetermined value, there is a high probability that the direction of the camera (i.e., framing of the picture) was changed and the main object has moved outside the object distance measuring zone. The luminance of the second photometering zone (B1 through B4) is then weighted by a larger value to calculate the exposure value. Conversely, if there is a luminance difference, between the first and second photometering operations, of less than some predetermined value, weighting of the luminance of the second photometering zone is not carried out.

In accordance with the detection results thus obtained, the CPU 20 outputs a command signal into the exposure control circuit 23. When the release switch is turned ON by the actuation of the shutter button by its full depression (full step), the exposure control circuit 23 drives the driver 24 in accordance with the commanded calculation results, to thereby drive the shutter/diaphragm 26.

As can be seen from the above discussion, according to the present invention, the weighting of the luminances of the first photometering zone A and the second photometering zone (B1 through B4) is modified to obtain an optimum exposure value of the main object, depending on whether the focus lock mode is turned ON or OFF. Furthermore, the weighting of the luminance of the third photometering zone (C, D1 and D2) is effected so as to balance the main object and the background, corresponding to the luminances of the first and second photometering zones in the respective photographing modes.

Therefore, a picture, in which the optimum exposure value of the main object is obtained in any photographing mode and in which the luminances of the main object and the background are well balanced, can be produced with a simple and inexpensive camera.

I claim:

1. A photometering apparatus for a camera, comprising:
   a split type photometering device for measuring the luminance of an object to be photographed, in which a picture plane is divided into a plurality of object luminance measuring zones;
   an insensible band which photoelectrically isolates said object luminance measuring zones from one another;
   an automatic focusing device which selectively has a focus lock mode in which once an object within an object distance measuring zone is in focus, the focus is maintained, and a non-focus lock mode in which the focus is continuously adjusted within said object distance measuring zone; and,
   exposure control means to vary the weighting of the luminance signals of said object luminance measuring zones of said split type photometering device in order to calculate an exposure value, depending on the selection of said focus lock mode or said non-focus lock mode; wherein said exposure control means further comprises means for varying the weighting of the luminance signals between operations solely in said focus lock mode, when the luminance difference between outputs from a first photometering zone between a first photometering operation and a second photometering operation is greater than a predetermined value.

2. A photometering apparatus according to claim 1, wherein said split type photometering device has a central photometering zone for detecting the luminance of the object at the center of the an image area, and an intermediate photometering zone located on opposite sides of the central photometering zone to detect the luminance of the object located in an intermediate portion between the center and the peripheral edge of said image area.

3. A photometering apparatus according to claim 2, wherein said exposure control means weights the luminance signal of the object in said central photometering zone in said focus lock mode by a value smaller than that of the non-focus lock mode.

4. A photometering apparatus according to claim 2, wherein said split type photometering device comprises a peripheral photometering zone outside said intermediate photometering zone.

5. A photometering apparatus according to claim 2, wherein said intermediate photometering zone includes intersecting points between a first pair of lines which equally divide a major side of said image area into three segments and a line normal to said first lines passing the center point of said image area, and intersecting points between a second pair of lines which equally divide a minor side of said image area into three segments and a line normal to said second lines passing the center point of said image area.

6. A photometering apparatus for a camera according to claim 1, wherein said exposure control means comprises means for increasing the weighting of the luminance signals from a second photometering zone, when the luminance difference between the outputs from said first photometering zone between a first photometering operation and a second photometering operation is greater than a predetermined value.

7. A photometering apparatus for a camera, comprising:
   a first photometering zone corresponding to the center of a rectangular image area;
   a second photometering zone which contains points located at the intersection of a first pair of lines which equally divide a major side of said rectangular image area into three segments and a line normal to said first pair of lines, on which the center point of said image area is located, and points located at the intersection of a second pair of lines which equally divide a minor side of said rectangular image area into three segments and a line normal to said second pair of lines, also on which the center point of said image area is located;
   a third photometering zone corresponding to a peripheral area of said image area; and
   arithmetic operating means for calculating an exposure value in accordance with output from said first, second and third photometering zones; wherein said arithmetic operating means performs different operations when, in a focus lock mode, the luminance difference between the outputs from said first photometering zone between a first photometering operation and a second photometering operation is greater or less than a predetermined value.

8. A photometering apparatus according to claim 7, wherein said arithmetic operating means performs different operations depending on the auto focus modes of the camera, said auto focus modes including said focus lock mode and a release priority mode.

9. A photometering apparatus according to claim 7, wherein said arithmetic operating means comprises means for increasing the weighting of the luminance signals from a second photometering zone, when the luminance difference between the outputs from said first photometering zone between a first photometering operation and a second photometering operation is greater than a predetermined value.

10. A photometering apparatus according to claim 7, further comprising an insensible band which photoelectrically isolates said photometering zones from one another.

* * * * *

UNITED STATES PATENT AND TRADEMARK OFFICE
CERTIFICATE OF CORRECTION

PATENT NO. : 5,289,225
DATED : February 22, 1994
INVENTOR(S) : I. HIRAI

It is certified that error appears in the above-indentified patent and that said Letters Patent is hereby corrected as shown below:

On the cover, section [56] of the printed patent, under "U.S. PATENT DOCUMENTS", add the following items:

---3,741,088  6/73   Nobusawa
   3,945,732  3/76   Nobusawa
   3,971,046  7/76   Nobusawa
   3,994,595  11/76  Nobusawa
   4,527,881  7/85   Sugawara---.

On the cover, section [56] of the printed patent, under "U.S. PATENT DOCUMENTS", add ---5,021,818  6/91  Satoh et al.---.

On the cover, section[56] of the printed patent, under "FOREIGN PATENT DOCUMENTS", add the following items:

---61-279829  12/86  Japan
   62-215834  9/87   Japan
   1-235929   9/89   Japan---.

UNITED STATES PATENT AND TRADEMARK OFFICE
CERTIFICATE OF CORRECTION

PATENT NO. : 5,289,225
DATED : February 22, 1994
INVENTOR(S) : I. HIRAI

Page 2 of 2

It is certified that error appears in the above-indentified patent and that said Letters Patent is hereby corrected as shown below:

Column 7, line 37 (claim 1, line 5), change "a picture plane" to --an image area--
Column 7, line 63 (claim 2, line 4), change "the an" to --the--.

Signed and Sealed this

Twenty-fifth Day of February, 1997

Attest:

BRUCE LEHMAN

*Attesting Officer*  *Commissioner of Patents and Trademarks*